May 18, 1954 H. J. LIPKIN ET AL 2,679,043
BEACON RECEIVER
Filed May 21, 1946
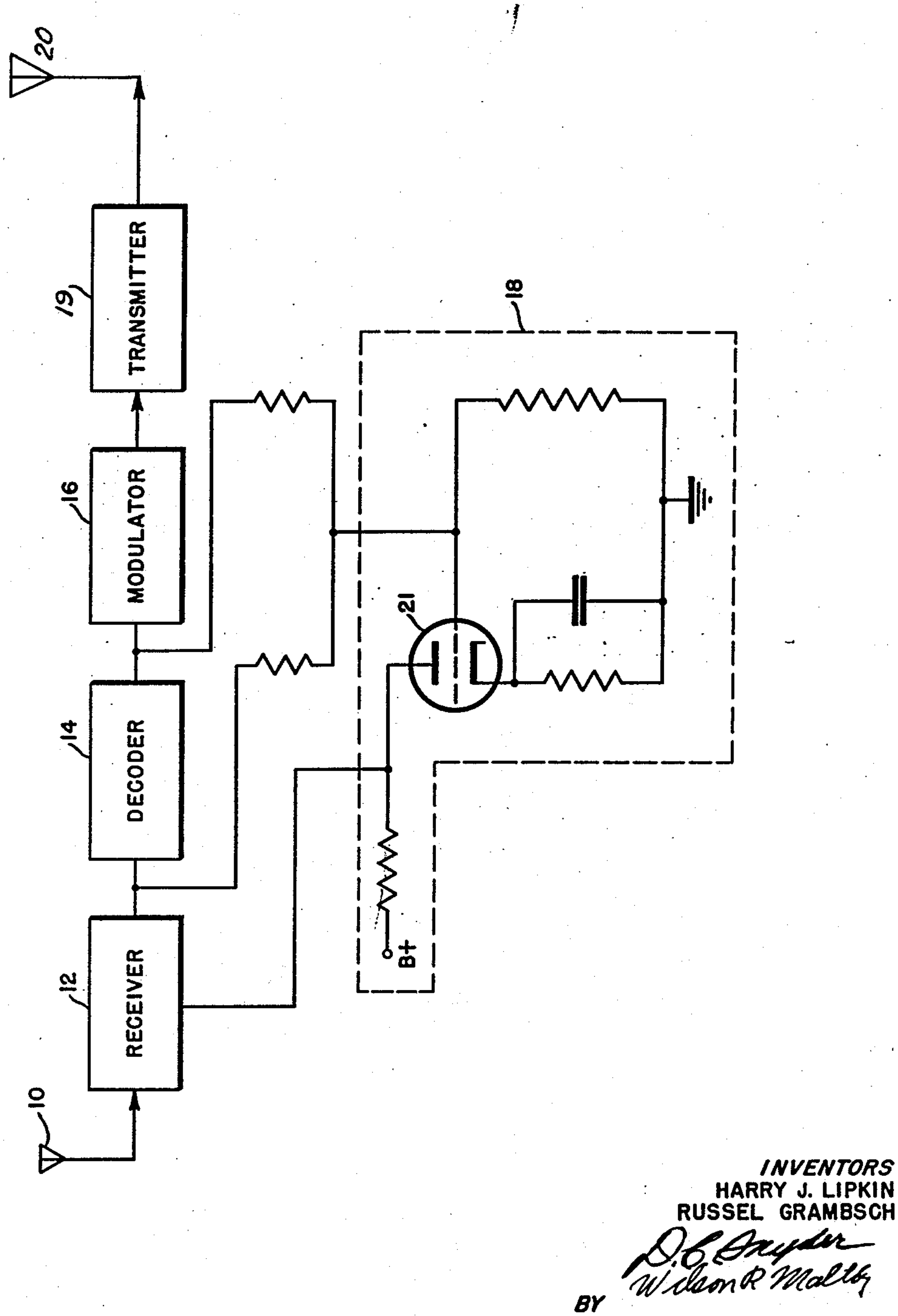
INVENTORS
HARRY J. LIPKIN
RUSSEL GRAMBSCH
BY D. C. Snyder
William R. Maltby
ATTORNEYS Patented May 18, 1954 2,679,043

UNITED STATES PATENT OFFICE 2,679,043

BEACON RECEIVER

Harry J. Lipkin, Dorchester, Mass., and Russel Grambsch, Marshfield, Wis., assignors, by direct and mesne assignments, to the United States of America as represented by the Secretary of War Application May 21, 1946, Serial No. 671,180

8 Claims. (Cl. 343—101)

This invention relates in general to beacon receivers and more particularly to automatic gain control for a code type beacon receiver.

A beacon receiver is used to receive trigger pulses from a radar interrogator and trigger off a transmitter to reply when any correct interrogation pulses are received. In some applications, it is desirable to have the beacon respond only to interrogations corresponding to the main lobe of the interrogating radar, and not to the side lobes and other spurious radiation. Since the main lobe is considerably stronger than the other signals, automatic gain control (hereinafter abbreviated AGC), which changes the receiver gain to a point where only the main lobe signals can trigger the beacon is used. This system presents difficulties, in that other stronger signals such as those from a nearby radar may take control of the AGC, thereby losing the desired signal. In a system requiring coded interrogation signals, an AGC which will function only on the coded signals will overcome these difficulties.

It is thus an object of this invention to provide a means for permitting a beacon receiver to distinguish between correct and stray trigger pulses.

Another object of this invention is to provide an automatic gain control circuit which will operate only on coded signals to control the operation of a beacon receiver.

Other objects and many of the attendant advantages of this invention will be readily appreciated as the same becomes better understood by reference to the following detailed description considered in connection with the accompanying drawing, the single figure of which presents a preferred embodiment of the invention in block diagram form.

The invention will now be described with reference to the drawing. Coded interrogation signals are received by antenna 10 and applied to receiver 12. These signals may be coded in any suitable manner, such as time coding, or may be at different frequencies. They are amplified and detected by receiver 12 which in turn applies them to a decoder 14. Decoder 14 operates to put out a trigger pulse to operate modulator 16 of a transmitter 19 whenever a properly coded interrogation pulse is received. The output of transmitter 19 is applied to antenna 20.

An AGC circuit 18 is provided which operates from the output of receiver 12. It differs from conventional AGC circuits in that a triode or multi-grid tube is used instead of a diode for the generation of the control signal. In the preferred embodiment illustrated in the drawing, a triode 21 is used in AGC circuit 18. The grid or grids of the AGC tube are normally biased to cut the tube off. If this is done, no gain control signal is generated, hence, the receiver normally operates at maximum gain. This does not constitute a disadvantage since the unwanted signals will not be passed by decoder signals nor will they be averaged to provide an AGC bias. When a correct interrogation signal is received, the output from decoder 14 is applied to the grid of the AGC tube 21 in AGC circuit 18 to permit the circuit to operate and provide a gain control output signal. In other words, only signals occurring in the output of receiver 12 at the time a decoded signal appears in the output of decoder 14 will be averaged to provide an AGC bias voltage. This bias voltage will then set the bias on one or more stages in the receiver 12 at such a level that only the correct interrogation signals will come through the receiver to operate the modulator and the remainder of the system.

Thus, this invention permits reception of all interrogation pulses until a correct interrogation is received. When correct interrogation pulses are received, the AGC circuit will then operate to permit only the reception of these correct pulses to prevent stray signals from operating the beacon.

It is believed that the construction and operation as well as the advantages of our automatic gain control for coded beacon receivers will be apparent from the foregoing detailed description thereof. It will also be apparent that while we have shown and described our invention in a preferred form, changes may be made in the circuit disclosed without departing from the spirit of the invention as sought to be defined in the following claims.

What is claimed is:

1. Electrical apparatus comprising, a receiver, a decoder coupled to the output of said receiver for decoding interrogation pulses received by said receiver, and means coupled to said receiver and said decoder and responsive to the outputs of said decoder and said receiver for rendering said receiver non-responsive to all of said coded interrogation pulses having amplitudes below a predetermined level.

2. Electrical apparatus comprising, a receiver, a decoder coupled to the output of said receiver for decoding any predeterminatively coded pulses appearing at the output of said receiver, and means coupled to said receiver and said decoder and responsive to the outputs of said receiver and decoder for rendering said receiver non-responsive to all of said predeterminatively coded pulses having amplitudes below a predetermined level.

3. Apparatus as in claim 2, said apparatus further comprising, a modulator coupled to the output of said decoder, said modulator providing an output in response to the output of said decoder.

4. Electrical apparatus comprising, a receiver, a decoder coupled to the output of said receiver for decoding any predeterminatively coded pulses appearing at the output of said receiver, an automatic gain control circuit coupled to said receiver and said decoder, and responsive to the output of said receiver for generating a gain control signal during the occurrence of an output signal from said decoder, said gain control signal having an amplitude dependent substantially upon the amplitude of the output signal of said receiver, and means for coupling said gain control signal to said receiver to control the gain thereof, said gain control signal thereby rendering said receiver non-responsive to all of said predeterminatively coded pulses having amplitudes below a predetermined level.

5. Apparatus as in claim 4, said apparatus further comprising, a modulator coupled to the output of said decoder, said modulator providing an output signal in response to an output of said decoder.

6. In a radar beacon system including a transmitter, means for receiving radio frequency energy, decoding means coupled to the output of said receiver and responsive to said received energy to provide an output only when said energy is predeterminatively modulated, means for triggering said transmitter in response to an output signal appearing at said decoder, means for developing a gain control voltage for said receiving means, and means for rendering operative said automatic gain control means only when said energy is predeterminatively modulated.

7. In a radar beacon system including a transmitter, means for receiving radio frequency energy, a decoder coupled to the output of said receiver and adapted to provide an output only when the said energy is predeterminatively modulated, means for triggering said transmitter in response to an output signal appearing at said decoder, and means operative from said decoder output and said receiver output for automatically controlling the gain of said receiver to limit reception of said energy to amplitudes thereof above a predetermined level.

8. In a radar beacon system including a transmitter, means for receiving radio frequency energy, a decoder coupled to the output of said receiver and adapted to provide an output only when said received radio frequency energy is predeterminatively modulated, means for triggering said transmitter in response to an output signal appearing at said decoder, and automatic gain control means coupled to the outputs of said receiver and said decoder for controlling the gain of said receiver, said automatic gain control means being operative only when there is an output appearing at said decoder.

References Cited in the file of this patent

UNITED STATES PATENTS

| Number | Name | Date |
|---|---|---|
| 2,141,343 | Campbell | Dec. 27, 1938 |
| 2,406,019 | Labin | Aug. 20, 1946 |
| 2,414,992 | Wheeler | Jan. 28, 1947 |
| 2,415,359 | Loughlin | Feb. 4, 1947 |
| 2,415,667 | Wheeler | Feb. 11, 1947 |
| 2,419,571 | Labin et al. | Apr. 29, 1947 |
| 2,425,315 | Atwood et al. | Aug. 12, 1947 |
| 2,427,191 | Brink | Sept. 9, 1947 |
| 2,451,044 | Pierce | Oct. 12, 1948 |
| 2,530,096 | Sudman | Nov. 14, 1950 |
| 2,548,813 | Perkins et al. | Apr. 10, 1951 |